March 17, 1970     J. L. BENAK     3,501,349
METHOD OF TREATING ALUMINUM-LITHIUM ELECTRODE
Filed May 16, 1966     2 Sheets-Sheet 1

INVENTOR
JAMES L. BENAK

BY *Kramer & Sturges*

ATTORNEYS

March 17, 1970  J. L. BENAK  3,501,349
METHOD OF TREATING ALUMINUM-LITHIUM ELECTRODE Filed May 16, 1966  2 Sheets-Sheet 2

INVENTOR
JAMES L. BENAK
BY Kramer & Sturges
ATTORNEYS

United States Patent Office 3,501,349
Patented Mar. 17, 1970

3,501,349
METHOD OF TREATING ALUMINUM-LITHIUM ELECTRODE
James L. Benak, Cleveland, Ohio, assignor to The Standard Oil Company, Cleveland, Ohio, a corporation of Ohio
Filed May 16, 1966, Ser. No. 550,239
Int. Cl. H01m 43/00, 13/08
U.S. Cl. 136—20                                     5 Claims

ABSTRACT OF THE DISCLOSURE

Removal of the surface film of a lithium-aluminum alloy renders it particularly useful as an anode in a secondary cell, i.e., one which can be recharged. Such cells, in this instance, are characterized by a relatively constant potential.

---

This invention relates to the improved operability of an electrode and more particularly to the operability of an aluminum-lithium electrode. Electrical energy storage cells of advanced construction are composed of a first electrode of an aluminum-lithium composition, a counter-electrode of various compositions and a lithium chloride-potassium chloride eutectic electrolyte.

The aluminum-lithium electrode is characterized as a constant potential electrode. That is, when the electrode is placed in a container with a reference electrode and a counter-electrode of another material, such as carbon, the potential of the aluminum-lithium electrode is constant. Parenthetically, it is noted that a graph of the potential of the total cell discharge is gradient downwardly. This is because the discharge curve of the carbon electrode is gradient downwardly. When the electrode potentials are added algebraically, the cell discharge potential is also gradient downwardly.

The aluminum-lithium electrode on charge is charged to a potential slightly less than the decomposition voltage of the electrolyte in the cell, or about 3.34 volts at 500° C. and when discharged should hold constant at this level until fully discharged. In actual practice, however, it has been found that the aluminum-lithium electrode does not actually discharge at a constant potential, but the potential drop of the electrode is a gradient downwardly. Those working on the aluminum-lithium electrode could attribute no valid reason for the decline and felt that this eccentricity was truly a natural phenomenon produced by an unknown mechanism. The puzzle appeared even darker from the results of the research work done to eliminate the problem.

Several avenues of approach were attempted to eliminate the problem. At first it was thought that the potential decline might be due to voltage leakage on open circuit. This was checked, but no significant leakage was found.

It was then postulated that a structural defect within the aluminum-lithium electrode might be the cause of the problem. However, analysis of the electrode proved it to be structurally sound.

The presence of simple impurities in the electrode composition was also considered as a possible cause of the problem. This theory was discarded when it was realized that such simple impurities would decompose or dissolve at voltages developed during the charging of the cell.

Accordingly, it is an object of the present invention to provide an improved aluminum-lithium electrode with a constant potential.

This and other objects will become apparent from the description and drawings of the present invention in which:

FIG. 1 is a graph showing a plot of an aluminum-lithium electrode potential versus time during initial charge and discharge. The dotted line illustrates the potential of the aluminum-lithium electrode versus a chlorine reference electrode. It is to be noted that the aluminum-lithium electrode versus a chlorine reference electrode. It is to be noted that the aluminum-lithium electrode shows an initial potential of about 1.7 volts, which potential reaches about 3.34 volts on charge, but that on discharge, which is any point on the dotted line subsequent to the first time the potential reaches 3.34 volts, the discharge is erratic. To be noted also is the fact that the cell potential, which is the combined potential of the aluminum-lithium electrode and the counter-electrode, also follows this erratic plot. The increase in voltage during discharge at A is attributed to the physical rupture of the surface film by lithium diffusing out.

FIG. 2 is a plot of the aluminum-lithium electrode potential and the cell potential during discharge following at least 10 cycles (charging and discharging being considered one cycle). Normally an equilibrium is reached within about 10 cycles. Although the aluminum-lithium electrode potential and the cell potential are more predictable from their plots, the aluminum-lithium electrode still exhibits a gradient type of cell potential rather than a constant potential.

FIG. 3 shows a plot of an aluminum-lithium electrode potential versus time during initial charge and discharge after the application of the inventive aspects of the present invention. The potential of the aluminum-lithium electrode is constant and the potential of the cell, which is the combined electrode potential, is initially about 1.9 volts as opposed to 1.1 volts as shown in FIG. 1. After charge, the cell shows a gradient downward slope on discharge.

According to the present invention, it has now been discovered that the downwardly gradient potential of the aluminum-lithium electrode is due to a surface film, of undetermined composition, but one which develops upon exposure of the electrode to air.

As previously noted, the presence of simple impurities in the electrode composition was considered as a possible cause of the problem, but the theory was discarded. The reason the theory was discarded can be best understood by a description of certain cell cycling tests made in vitro and a discussion of the results of these tests.

Figure 5:
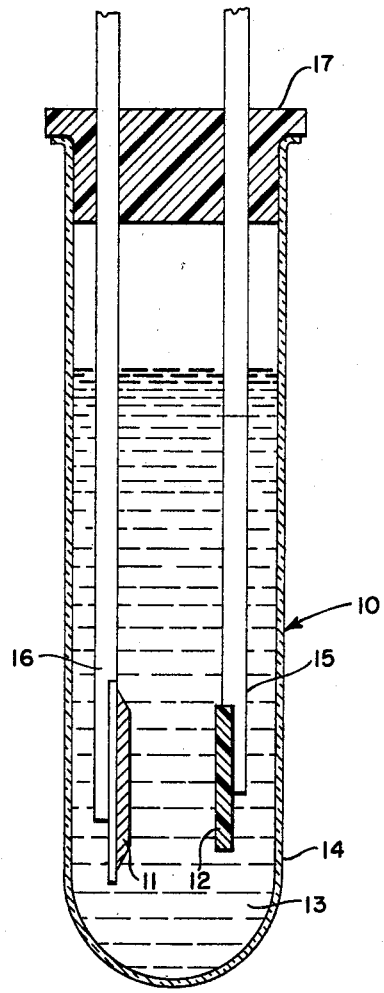
FIG. 5 is an electrical energy storage cell embodying the concepts of the present invention.

FIG. 5 shows a schematic test cell indicated generally as 10. An aluminum-lithium electrode 11 and an opposed counter-electrode 12 are positioned one from another in spaced relationship, immersed in an electrolyte 13 held in a heat resistant transparent glass tube 14. The aluminum-lithium electrode 11 is fixed rigidly to a steel current carrier 16 and the counter-electrode 12 is fixed rigidly to a graphite current carrier 15. The container comprising the electrolyte and electrodes is purged of atmospheric air and an inert gas (e.g., argon) introduced into the container. The open end of the container is then sealed with a cap 17 of inert material, such as lava or ceramic. The cell is connected to external circuitry such that the aluminum-lithium electrode is maintained negative and the counter-electrode positive and the cell charged to a maximum voltage below the decomposition voltage and then discharged.

Figures 1, 2:
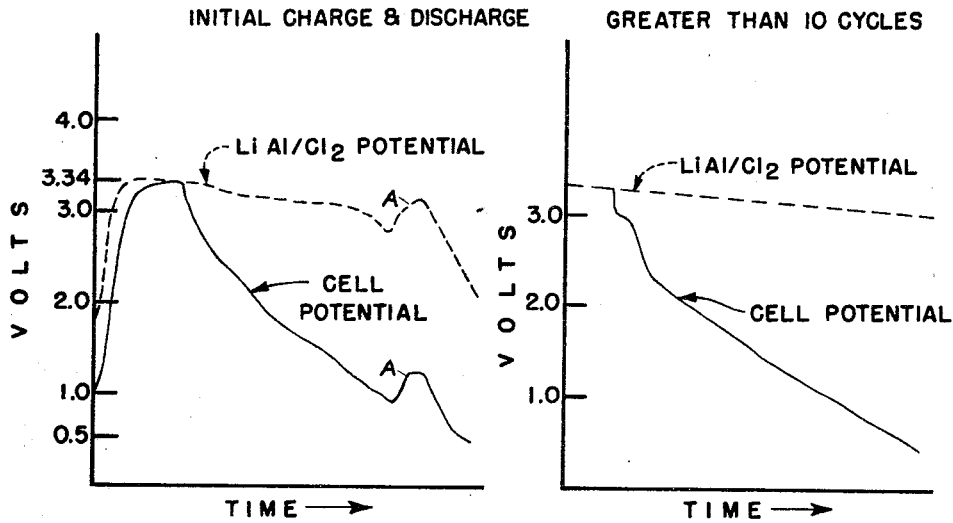
Figures 3, 4:
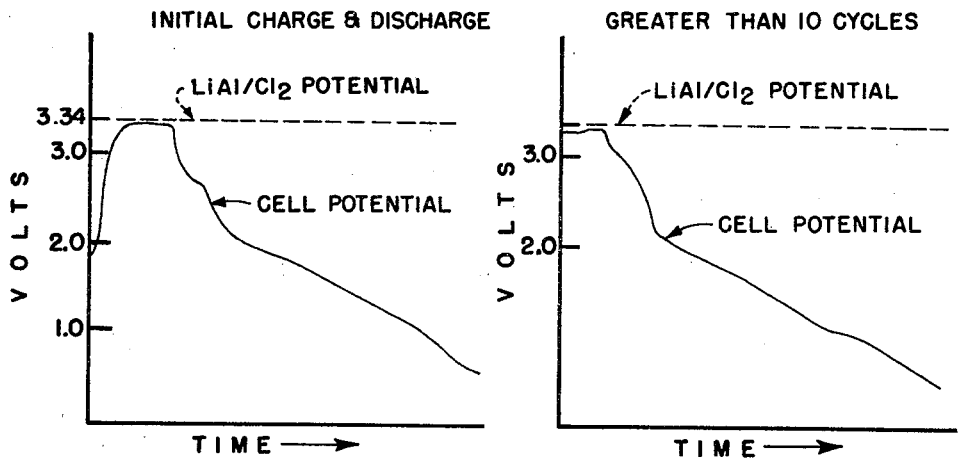
FIG. 4 illustrates the potential of an aluminum-lithium electrode modified in accordance with this invention (dotted line) and the cell potential (solid line) during discharge, following at least 10 cycles. The potential of the aluminum-lithium electrode is constant and the slope of the graph of the potential is relatively uniform.

Upon cycling the cell, i.e., charging and discharging it, it was observed through the glass tube that solid material flaked off the surface of the aluminum-lithium electrode and settled to the bottom of tube 14, exposing a bright, silvery electrode surface. The flaking was a transistory phenomenon, which could explain the erratic electrode potential observed during initial charge and discharge (see FIG. 1). It was felt, however, that the transitory flaking phenomenon could not be responsible for the long term damage in the form of a gradient discharge potential exhibited by the cell (see FIG 2). In other words, if the gradient discharge potential could be attributed to the flaking action, the potential would have been expected to become constant when the flaking ceased. This, however, was not th ecase, as FIG. 2 shows, and so the search continued for other causes of the erratic electrode behavior.

It was therefore surprising to discover in the final analysis that a constant potential aluminum-lithium electrode could be developed by freeing the electrode of surface film prior to incorporating it in a cell. This was established in the following manner:

The entire surface of an electrode was scraped while submerged in an inert hydrocarbon solvent. The electrode was then kept out of contact with air until it was submerged in electrolyte during the normal cell fabrication procedure. The cell was then charged and discharged cyclically. The pretreated aluminum-lithium electrode developed an initial voltage of 3.34 volts, and this remained constant on discharge.

The surface film can be removed by physically scraping it from the electrode by means of a scraper, file or emery paper, or the film can be removed by placing the electrode in an inert atmosphere and coating the surface with a dilute acid or alkali. After removal of the film, the electrode has a silvery appearance. Other means of film removal are also contemplated. Once the film has been removed, the electrode is placed in a solvent so as to be free from the atmosphere, or more particularly the surface film is removed under a blanket of solvent and remains under the solvent until ready for use. Suitable solvents are cetane and n-heptane. Under the solvent, the silvery appearance remains so long as air is excluded. As shown in FIG. 5, a cell comprising an electrode of the present invention, a carbon positive electrode and a lithium chloride-potassium chloride eutectic electrolyte was constructed.

The aluminum-lithium alloy of the electrode comprises aluminum in amounts of from about 70 to 95 percent, based on total composition, and from about 5–30 weight percent, based on total composition lithium. Impurities such as, for example, copper, magnesium, manganese, indium and iron may be present in quantities less than 10 weight percent, based on total composition.

The aluminum-lithium electrode functions best in a lithium halide electrolyte, and is capable of storing the lithium metal of the electrolyte without forming an extensive liquid. Hence, the electrode remains solid, which solid electrode is capable of diffusing the lithium metal through its structure. It has been found that on charge of the cell comprising the aluminum-lithium electrode, the electrode structure expands wherein lithium metal enters the electrode structure. On discharge, the lithium metal leaves the electrode structure. The electrode must, therefore be able to withstand the stresses of expansion and contraction.

Opposed to the aluminum-lithium electrode is a positive electrode comprising, as for example, carbon.

The electrolyte used in the device of this invention is a material comprising a source of disassociated metal and halide ions which are mobile and free to move in the material. Fused salt mixtures containing, for example, sodium chloride, calcium chloride, calcium fluoride, magnesium chloride, lithium chloride, potassum chloride, lithium bromide and potassium bromide can be used. These salts are particularly desirable from the standpoint of their low original cost. However, other economic factors, such as the operating temperature (size and cost of insulation packing for a reasonable heating cost), corrosiveness of the electrolyte or electro-decomposition products on the cell components and purification of the electrolyte must be considered. The lower melting point electrolytes are desirable. However, it is contemplated by the present invention that the electrolyte be operable at temperatures up to about 600°C.

Typical examples of materials which can be used as electrolytes include salts of metals. Specific examples of useful binary salt electrolytes are lithium chloride-potassium chloride, lithium chloride-magnesium chloride, lithium chloride-sodium chloride, lithium bromide-potassium bromide, lithium fluoride-rubidium fluoride, lithium chloride-rubidium chloride, lithium chloride-lithium fluoride, lithium chloride-strontium chloride, cecium chloride-lithium chloride, calcium chloride-lithium chloride, lithium sulfate-potassium chloride and mixtures thereof.

Examples of ternary molten salt electrolytes are calcium chloride-lithium chloride-potassium chloride, lithium chloride-potassium chlorde-sodum chloride, calcium chloride-lithium chloride-sodium chloride, and lithium bromide-sodium bromide-lithium chloride.

Especially preferred systems are the potassium chloride-lithium chloride and lithium bromide and potassium bromide and mixtures thereof.

A lithium chloride-potassium chloride system of 41 mole per cent potassium chloride and 59 mole percent lithium chloride forms a eutectic which melts at 352° C. The potassium chloride-lithium chloride eutectic has a calculated decomposition voltage of about 3.62 volts.

Operation of the aluminum-lithium electrode and the benefits of this invention are not temperature dependent and may be realized at any temperature below the melting point of the electrode.

What is claimed is:

1. In the fabrication of an electrical energy storage cell from a container, a pair of spaced, opposed electrodes, one of which is an aluminum-lithium alloy electrode, and an electrolyte, the improvement comprising the steps of removing a surface film from the aluminum-lithium electrode while the electrode is enveloped in an inert environment and is maintained out of contact with air until immersed in the electrolyte, depositing the electrolyte in the container, and immersing the aluminum-lithium electrode and the counter-electrode in the electrolyte.

2. In the fabrication of an electrical energy storage cell in accordance with claim 1 the improvement wherein the surface film is removed from the aluminum-lithium alloy electrode by mechanical means.

3. In the fabrication of an electrical energy storage cell in accordance with claim 1 the improvement wherein the surface film is removed by chemical means.

4. The improvement of claim 1 wherein the inert environment is a hydrocarbon solvent.

5. In the fabrication of an electrical energy storage cell in accordance with claim 4 the improvement wherein the inert environment is a liquid hydrocarbon.

References Cited

UNITED STATES PATENTS

| | | | |
|---|---|---|---|
| 3,228,866 | 1/1966 | Pryor | 204—197 |
| 1,457,149 | 5/1923 | Cunningham | 204—33 |
| 1,620,081 | 3/1927 | Czochralski | 75—138 |
| 2,785,111 | 3/1957 | Vierk | 252—59 |
| 2,898,230 | 8/1959 | Bulloff | 29—197 |
| 3,080,330 | 5/1963 | Rudel | 252—59 |
| 3,160,531 | 12/1964 | Spindler | 136—153 |
| 3,301,711 | 1/1967 | King | 75—138 |
| 3,336,163 | 8/1967 | Wolfe | 136—120 |

OTHER REFERENCES

McKay & Worthington, Corrosion Resistance of Metals and Alloys, p. 112 et seq. (1936).

WINSTON A. DOUGLAS, Primary Examiner

PETER D. ROSENBERG, Assistant Examiner

U.S. Cl. X.R.

136—120; 204—197